Dec. 13, 1955  P. C. JURS ET AL  2,726,840
VALVE CONSTRUCTION
Filed Dec. 8, 1951
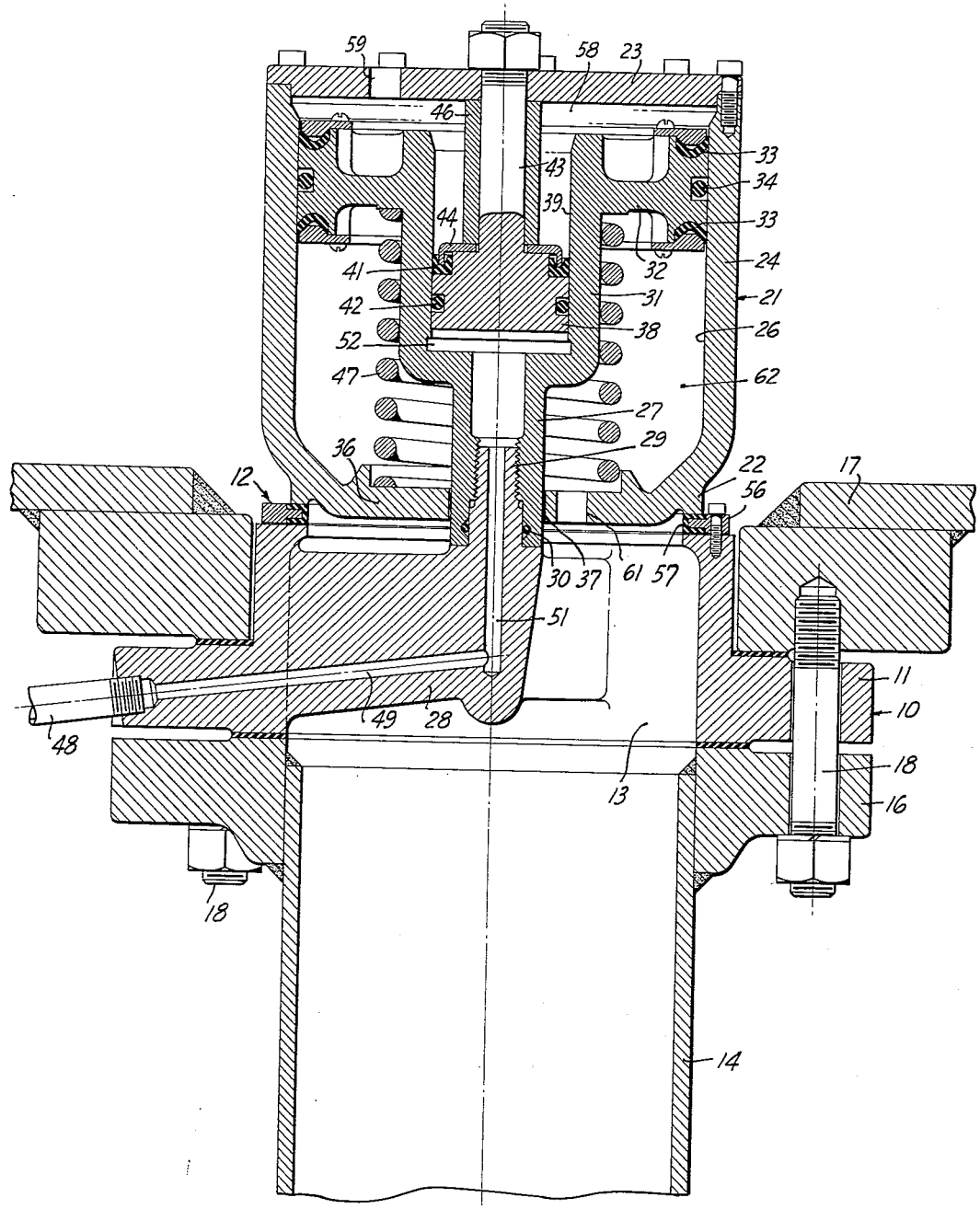
INVENTORS
Peter C. Jurs
BY Joseph P. Van Overveen
ATTORNEYS

United States Patent Office 2,726,840
Patented Dec. 13, 1955

2,726,840

VALVE CONSTRUCTION

Peter C. Jurs, Oakland, and Joseph P. Van Overveen, Lafayette, Calif., assignors, by mesne assignments, to Shand and Jurs Company, Berkeley, Calif., a corporation of California Application December 8, 1951, Serial No. 260,644

2 Claims. (Cl. 251—62)

This invention relates generally to fluid flow control valves of the type adapted to be operated from a remote point by application of a controlling fluid pressure.

Remote operated valves of the above character have been used for many industrial applications. Particular reference can be made to tank valve systems of the type disclosed in Jurs Patent 1,976,445. In such systems it is common practice to install fluid operated valves in the bottom wall of motor truck tanks to enable an operator to control the dispensing of gasoline or other petroleum products from a convenient valve control station, usually located at the side or rear of the truck. A valve unit suitable for use in such a system is disclosed in A. E. Jurs, Jr., Patent 2,549,689. A characteristic of such valves is that they may be opened by abnormal application of back pressure in the outflow or discharge piping. This is generally undesirable for reasons depending upon the particular application for which the valve is being used. When a plurality of valves discharge into common piping, as with the tank valve system of Jurs 1,976,445, the opening of a valve under abnormal back flow pressure may result in undesirable flow of liquid from one tank compartment to another, with resulting intermixing of liquids.

It is an object of the present invention to provide a valve of the above type which is not opened or otherwise affected by abnormal back pressure.

Another object of the invention is to provide a novel valve construction suitable for installation in tank valve systems of the type disclosed in Jurs 1,976,445.

Another object of the invention is to provide a valve of relatively simple construction, which can be readily manufactured and assembled, and which is relatively simple to install and to service.

Additional objects and features of the invention will appear from the following description in which the preferred embodiment has been set forth in detail in conjunction with the accompanying drawing.

The valve illustrated in the drawing consists of a body 10 which in this instance is provided with a flange 11. An annular valve seat 12 is formed on or mounted upon the body, and this seat surrounds the body opening 13 through which liquid may flow. An outflow or discharge pipe 14 is coupled to the body, and is shown with a coupling flange 16 for clamping to the flange 11 of the body. Assuming that the valve is mounted in the bottom wall 17 of a liquid tank, clamping studs 18 can be threaded into this bottom wall, and can extend through both the coupling flanges 11 and 16, as illustrated. It will be evident that various means can be used for connecting the piping 14 with the body of the valve, as for example a threaded pipe connection.

On the inflow side of the seat 12 there is a valve member 21 in the form of a hollow shell. One end portion of this member is provided with the annular rib 22, which forms an annular valve surface for engaging the seat 12. The other end of the valve member is provided with the removable cover plate 23. Portion 24 of the valve member is cylindrical to provide the cylindrical bore 26.

A fixed member 27 in the form of a post is disposed within the valve member, and is mounted upon the body. In order to provide a suitable mounting for this post, the body is provided with the radially extending arms or webs 28, which are attached to the member 27 as by means of the threaded connection 29. Suitable means such as the resilient O ring 30 serves to prevent leakage between these parts.

Member 27 carries a cylindrical portion 31 and a piston 32. Piston 32 has a suitable sealed sliding fit within the bore 26. As an example of suitable sealing means, the piston is shown provided with the "chevron" rings 33, and the O ring 34. These seal rings are formed of suitable resilient material such as synthetic rubber.

That end of the valve member 21 which is nearest the valve seat is provided with the end wall 36. An opening 37 in the wall 36 serves to accommodate the member 27.

A second piston 38, which is substantially smaller in diameter than piston 32, has a sealed sliding fit within the bore 39 of the cylindrical portion 31. As suitable sealing means this piston is shown provided with the cup washer and O ring 41 and 42, which are likewise formed of suitable resilient materials such as synthetic rubber. Piston 38 is attached to the stud 43, which in turn is secured to the center of the cover plate 23.

The cup washer 41 is shown loosely retained upon the piston by the flanged retaining washer 44, which in turn is clamped to the piston by the tubular spacer 46.

A compression spring 47 is disposed within the valve member for urging the latter toward closed position. One end of this spring seats upon the end wall 36 of the valve member and the other end seats upon the piston 32 as illustrated.

The source of controlling fluid pressure (not shown), is attached to the pipe 48. Ducts 49 and 51 in the valve body connect the pipe 48 with the space 52 below the piston 38. With this arrangement, when fluid under pressure is applied through the pipe 48, as for example from a suitable hydraulic actuator, such pressure is applied to space 52 to force the piston 38 upwardly, and thus move the valve member away from the seat 12.

Various types of stationary valve seats can be employed depending upon the service to which the valve is to be applied. Thus a simple metal seat can be provided, or one can employ non-metallic seats formed of various synthetic or plastic materials. In the particular construction illustrated, the seat is shown formed by a removable seat ring, including the annular metal part 56, and the non-metal annular part 57, which is bonded to the same. The non-metal part can be made of resilient material, such as a suitable resilient synthetic rubber, or of harder materials such as a phenolic condensation product.

In order to secure the operation desired it is necessary for the piston 32 to be dimensioned in a particular manner with respect to the mean effective diameter of the valve seat. More specifically, it is necessary for the diameter of the piston 32 to be substantially greater than the mean effective diameter of the valve seat. In the proportions illustrated in the drawing it will be noted that the outer diameter of the piston 32 (i. e. the diameter of the bore 26), is substantially the same as the outer diameter of the valve working surfaces. By valve working surfaces we have reference to the annular surfaces which are brought into sealing engagement between the seat 12, and the rib 22. As is well known to those familiar with valves, the mean effective diameter of the valve working surfaces is somewhat less than their outer diameter.

To explain the operation of our valve it will be assumed that it is installed in the bottom wall of a liquid tank or tank compartment, and that pipe 48 is connected to a hydraulic actuator or like source of controlling fluid pressure. The pressure of liquid in the tank above the working parts of the valve is freely transmitted to the space 58 above the piston 32, by one or more openings 59 in the cover plate 23. Similarly an opening 61 freely transmits fluid pressure from the outflow opening of the valve to the space 62 below the piston 32. When sufficient controlling pressure is applied to pipe 48, piston 38 is moved to move the valve member 21 to open position relative to the valve seat. Under such conditions liquid from the tank is free to flow through the body opening 13 and the discharge pipe 14. When the controlling pressure is reduced, as by venting fluid to the atmosphere, spring 47 acts to force the valve member back to closed position. Assuming that the valve is closed and that a back pressure is applied to the pipe 14, this pressure is transmitted to the space 62 below the piston 32. As a result the back pressure acts upon an effective fluid pressure area of the valve member which is greater than the area of the mean effective diameter of the stationary valve seat. Such fluid pressure therefore urges the valve member toward its seat. This action occurs irrespective of the value of the back pressure applied. Pressure in the tank (i. e. inflow pressure) likewise urges the valve toward closed position. Thus for a range of pressures of say 0 to 250 p. s. i., the valve is not opened or otherwise affected by application of such pressures to either one or both sides of the same.

With the above construction it will be evident that the valve is not affected by back pressure, and therefore it is impossible for back flow of liquid to occur from the discharge pipe into the liquid tank or other source of inflow liquid. A plurality of such valves can therefore be used in a tank valve system of the type disclosed in Jurs 1,976,445, without danger of the liquid within one tank or tank compartment being commingled with the liquid from another tank or compartment. When closed the valve is not affected by either pressure in the tank or pressure within the discharge line, within the pressure range for which it is designed, which for example may be from 0 to 250 p. s. i.

We claim:

1. In a valve construction, a stationary body member having an annular stationary valve seat and an outflow opening communicating through the seat, a movable valve member having an annular valve working surface cooperating with an annular valve working surface formed by the seat, the valve member being disposed on the inflow side of the seat, a stationary piston carried by the body and disposed on the inflow side of the seat, said valve member being formed on and carried by one end of the cylindrical member, the outer diameter of said piston being greater than the mean effective diameter of said valve working surfaces, the space on that side of the piston which is faced toward the valve seat being in unrestricted communication with the outflow opening and forming a space which is closed to the inflow side of the seat, spring means housed within said cylindrical portion and acting between the piston and valve member to urge the latter to a closed position, a second piston secured to the other end of the cylindrical member and disposed within the same, a second stationary cylinder carried by the body and having a sealed fit about said second piston, said second named piston and cylinder forming a closed fluid chamber, and means for establishing communication between said fluid chamber and a source of controlling fluid under pressure to effect movement of said valve member between open and closed positions.

2. In a valve construction, a body member having an annular stationary valve seat and an outflow opening through the seat, a movable valve member having an annular valve working surface cooperating with an annular valve working surface formed by the seat, said valve member being disposed on the inflow side of the seat, a cylindrical member extending from the inflow side of the seat, said valve member being formed on and carried by one end of the cylindrical member, a second cylinder disposed within said first named cylindrical member, means serving to mount said second cylinder upon said body, a piston carried by said second cylinder and having a sealed fit with respect to said first named cylindrical member, a compression spring interposed between said last named piston and said valve member to urge valve member toward closed position, the second piston carried by that end of the cylindrical member which is remote from the valve working surfaces, said second piston being fitted within said second cylinder to form a closed fluid chamber adapted to receive fluid under pressure to effect movement of the valve member between open and closed positions, the space within said first named cylindrical member and between the first named piston and said valve working surfaces being in free communication with the outflow side of the valve.

References Cited in the file of this patent

UNITED STATES PATENTS

| 86,381 | Evered | Feb. 2, 1869 |
| 737,706 | Chambers | Sept. 1, 1903 |
| 986,184 | Lilly | Mar. 7, 1911 |
| 1,305,365 | Hopkins | June 3, 1919 |
| 1,980,063 | Jensen | Nov. 6, 1934 |
| 2,549,689 | Jurs | Apr. 17, 1951 |

FOREIGN PATENTS

| 197,065 | Great Britain | May 10, 1923 |